(12) United States Patent
Kitano et al.

(10) Patent No.: US 7,112,755 B2
(45) Date of Patent: Sep. 26, 2006

(54) PRESSURE-SENSITIVE SENSOR

(75) Inventors: Mitsumasa Kitano, Yamatokohriyama (JP); Tsutomu Ueda, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 253 days.

(21) Appl. No.: 10/850,529

(22) Filed: May 19, 2004

(65) Prior Publication Data
US 2004/0231969 A1   Nov. 25, 2004

(30) Foreign Application Priority Data
May 21, 2003  (JP)  ............... 2003-143604
Feb. 27, 2004  (JP)  ............... 2004-054562

(51) Int. Cl.
*H01H 1/02*  (2006.01)

(52) U.S. Cl. ............... 200/511; 200/512; 200/520; 200/17 R

(58) Field of Classification Search ........ 200/511–512, 200/514, 520
See application file for complete search history.

(56) References Cited

U.S. PATENT DOCUMENTS

| | | | |
|---|---|---|---|
| 3,719,913 A | | 3/1973 | DuBose et al. |
| 4,996,511 A | | 2/1991 | Ohkawa et al. |
| 5,068,634 A | * | 11/1991 | Shrier ............... 338/21 |
| 5,219,494 A | * | 6/1993 | Ambros et al. ........ 252/511 |
| 5,260,848 A | * | 11/1993 | Childers .............. 361/127 |
| 5,669,381 A | * | 9/1997 | Hyatt ............... 428/402 |
| 5,948,990 A | | 9/1999 | Hashida |
| 6,555,024 B1 | * | 4/2003 | Ueda et al. .......... 252/511 |
| 6,777,361 B1 | * | 8/2004 | Aichele et al. ........ 501/88 |

FOREIGN PATENT DOCUMENTS

| | | |
|---|---|---|
| EP | 1 116 754 A2 | 7/2001 |
| JP | 2001-184944 A1 | 7/2001 |

OTHER PUBLICATIONS

Patent Abstracts of Japan for JP2001-184944 published on Jul. 6, 2001.
European Search Report for EP 04 25 3029 issued Sep. 22, 2005.

\* cited by examiner

*Primary Examiner*—Kyung Lee
*Assistant Examiner*—Richard K. Lee
(74) *Attorney, Agent, or Firm*—Darby & Darby

(57) ABSTRACT

The pressure sensitive sensor includes a sheet base, an application-side and a receiving-side electrode provided on the sheet base and conducting coatings provided on the electrodes. The conductive electrodes have pressure-sensitive conductive ink containing conductive carbon black. Resistance between the application-side electrode and the receiving-side electrode changes by a contact area between the conductive coatings on the electrodes. The pressure-sensitive conductive ink has an enhanced strength as a resin and an enhanced effect of dispersion of the conductive carbon black by adding 30 to 70 parts by weight of silicon dioxide to 100 parts by weight of silicone elastomer component as a binder. The pressure-sensitive sensor has output stability and linearity at temperatures in a wide range from −40° C. to 85° C.

10 Claims, 11 Drawing Sheets

Result of Evaluation Test on Temperature Characteristics (Example 1)

Result of Evaluation Test of Linearity of Pressure Sensitiveness
(Example 4)

Result of Evaluation Test on Temperature Characteristics
(Example 4)

Result of Evaluation Test of Linearity of Pressure Sensitiveness
(Example 6)

Result of Evaluation Test on Temperature Characteristics
(Example 6)

PRESSURE-SENSITIVE SENSOR

INCORPORATION BY REFERENCE

The present application claims priority under 35 U.S.C. §119 to Japanese Patent Application Nos. 2003-143604 filed on May 21, 2003 and 2004-054562 filed Feb. 27, 2004. The contents of the applications are incorporated herein by reference in their entireties.

FIELD OF THE INVENTION

This invention relates to a pressure-sensitive sensor using pressure-sensitive conductive ink.

In recent years, pressure-sensitive sensors have been expected to be applied, for example, to the field of automobiles. In use of pressure-sensitive sensors in automobiles, an output stability is required in an environment, where sensors are used, of temperatures with a wide range of −20° C. to 85° C., and further with a wider range of −40° C. to 85° C.

An example of a binder for pressure-sensitive conductive ink is a conventional binder using thermoplastic resin having a high hardness (polyester resin, phenoxy resin and the like) (e.g. Japanese Patent Application, Publication No.2001-184944). In this case, although a good linearity of pressure sensitiveness of output is obtained, there exists a problem that an output stability at a high temperature (85° C.) is low.

On the other hand, when a thermally stable silicone elastomer having a glass transition temperature around −40° C. is used as a binder of pressure-sensitive conductive ink, a high output stability in temperature is obtained, but there arises a problem that a linearity of pressure sensitiveness of output is poor.

It is hence an object of the present invention to provide a pressure-sensitive sensor with an improved output stability and irregularity in a wide range of temperatures from a low side (−20° C.) to a high side (85° C.) and further from a lower side (−40° C.) to a high side (85° C.), and also having linearity of pressure sensitiveness of output.

SUMMARY OF THE INVENTION

The pressure-sensitive sensor of the present invention includes a sheet base, an application-side and a receiving-side electrode provided on the sheet base, and conductive coatings provided on the electrodes. The conductive coatings have pressure-sensitive conductive ink containing conductive carbon black. In this pressure sensitive sensor, resistance between the application-side and the receiving-side electrode changes by a contact area between the conductive coatings with the pressure-sensitive conductive ink having conductive carbon black. The pressure-sensitive conductive ink has an enhanced strength as a resin and an enhanced effect of dispersion of conductive carbon black by adding 30 to 70 parts by weight of silicon dioxide to 100 parts by weight of silicone elastomer component as a binder.

The pressure-sensitive sensor according to the present invention functions as follows.

In general, a silicone elastomer component which has a glass transition temperature of around −40° C. is thermally stable at temperatures in a range from −20° C. to 85° C., and has a high output stability in temperature.

Also, addition of 30 to 70 parts by weight of silicon dioxide to 100 parts by weight of the silicone elastomer component increases strength of the elastomer, and the silicone elastomer component is compressed gradually by force and shows enhanced linearity of pressure sensitiveness of output.

Further, the addition of 30 to 70 parts by weight of silicon dioxide to 100 parts by weight of the silicone elastomer component enhances effect of dispersion of conductive carbon black, and thereby reduces irregularity of output.

In other words, the pressure-sensitive sensor of the present invention has improved output stability and reduced output irregularity in a wide range from a low temperature (−20° C.) to a high temperature (85° C.), and further favorable linearity of pressure sensitiveness of output.

In the pressure-sensitive sensor of the present invention, the silicon dioxide has a primary particle size of about 7 to about 40 nm, and the conductive carbon black has a primary particle size of about 20 to about 40 nm and is contained at 3 to 50 parts by weight with respect to 100 parts by weight of the silicone elastomer component.

The pressure-sensitive sensor of the present invention may further have a multi-point pressure-sensitive part with a variation coefficient greater than 0 and less than or equal to 0.3.

The sheet base of the pressure-sensitive sensor of the present invention may be a pair of sheet base members of polyethylene naphthalate, one of the members has conductive coating that covers the application-side electrodes, while the other of members has conductive coating that covers the receiving-side electrodes. The conductive coatings are surrounded by a spacer so that a space may be obtained between the conductive coatings opposing each other at a no-load state. The spacer can be formed either with a UV coating agent layer and an adhesive agent layer or with a polyethylene naphthalate film and an adhesive agent layer.

Further, in place of the pair of sheet base members of polyethylene naphthalate, a pair of sheet base members of polyimide can be used. In this case, the spacer can be formed with a polyimide film and an adhesive agent layer.

The pressure-sensitive sensor according to the present invention has an improved output stability and a reduced output irregularity at temperatures in a wide range from low (−20° C.) to high (85° C.), or in a wider range from lower (−40° C.) to high (85° C.), and further favorable linearity of pressure sensitiveness of output.

DETAILED DESCRIPTION OF THE PREFERRED EMBODIEMNTS

The basic construction of the pressure-sensitive sensor S used in Examples 1 to 3 is as follows.

Figure 1:
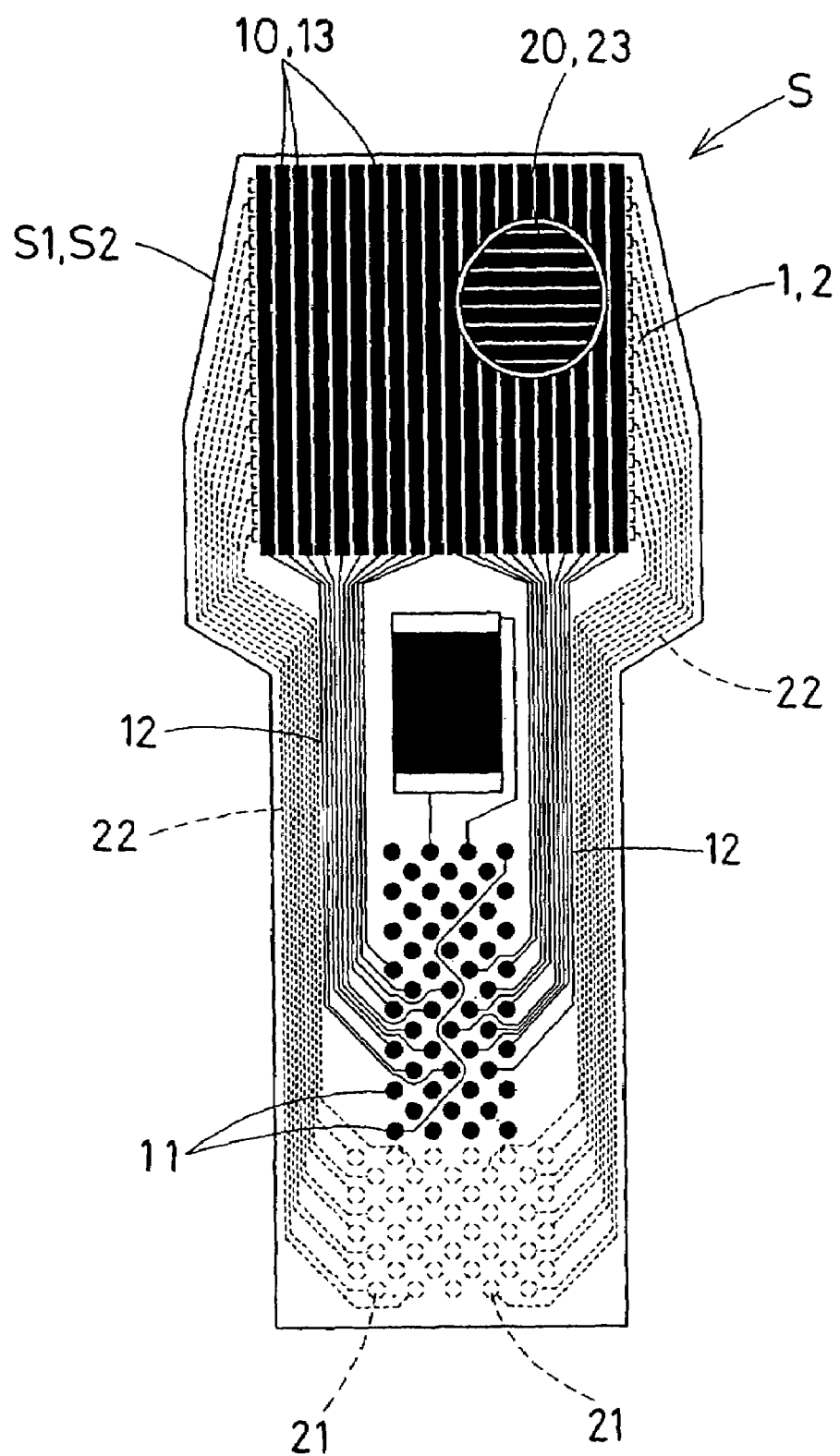
FIG. 1 is a plan view of a pressure-sensitive sensor of Examples 1 to 3 of the present invention.
Figure 2:
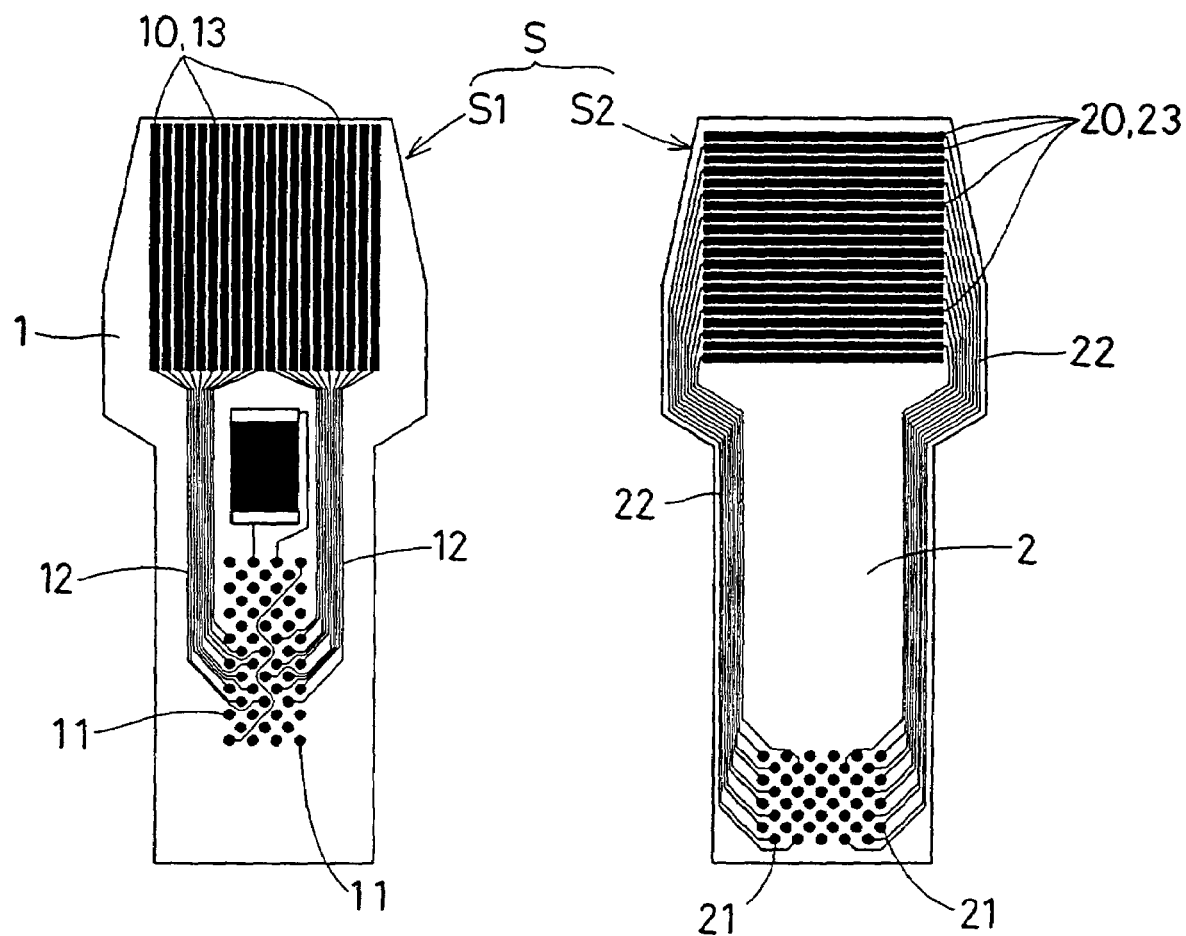
FIG. 2 is a plan view showing two sheets of constituent elements forming the pressure-sensitive sensor.
Figure 3:
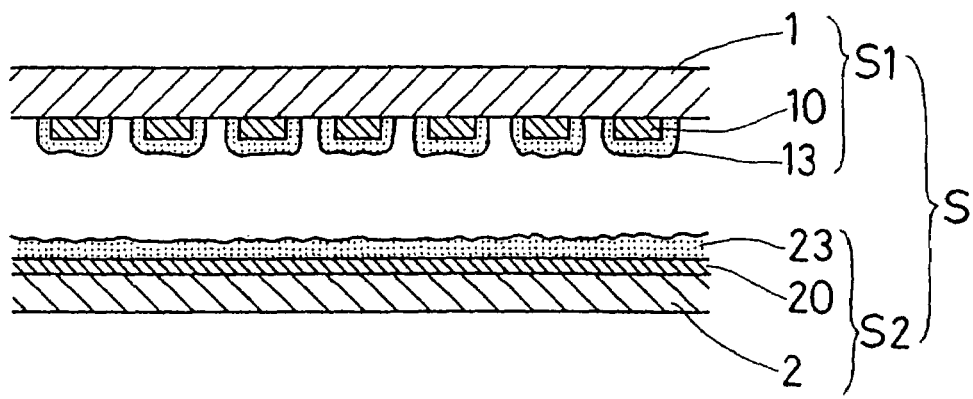
FIG. 3 is a cross-sectional view of the pressure-sensitive sensor.

The pressure-sensitive sensor S shown in FIGS. 1 to 3 is one example of a multi-point sensor (a multi-point cell pattern). As shown in FIGS. 1 and 2, the sensor S is formed in a manner that a constituent element S1 and a constituent element S2 are bonded together. As clearly shown in FIG. 2, the constituent element S1 is formed, by printing with silver, application-side electrodes 10, application-side terminals 11, and connecting wires 12 on a sheet base member 1, and further adding pressure-sensitive conductive ink 13 on each of the application-side electrodes 10 by printing. The constituent element S2 is formed, by printing with silver, receiving-side electrodes 20, receiving-side terminals 21, and connecting wires 22 on a sheet base member 2, and further adding pressure-sensitive conductive ink 23 on each of the receiving-side electrodes 20 by printing. Then, as shown in FIG. 3, the sheet base members 1 and 2 are integrated with each other with an adhesive agent or the like in a manner such that the application-side electrodes 10 and the receiving-side electrodes 20 perpendicularly cross each other and the pressure-sensitive conductive inks 13 and 23 oppose each other.

The pressure-sensitive sensor has a thickness of about 0.1 mm and flexibility as a whole. Also, in this sensor, the application-side electrodes 10 are constituted in row electrodes, and the receiving-side electrodes 20 are constituted in column electrodes.

Hereinafter, constructions of Examples 1 to 3 of the present invention and those of Comparative Examples 1 and 2 being described, in use of the pressure-sensitive conductive ink 13 and 23, the result of output stability (irregularity) of the pressure-sensitive sensors in a wide range of temperatures from −20° C. to 85° C. and linearity of pressure sensitiveness of output will be shown.

EXAMPLE 1

A varnish A solution and a varnish B solution were prepared from two-liquid curing type silicone elastomer base solutions. Specifically the varnish A solution was prepared by dissolving 100 parts by weight of a base solution A (manufactured by Jujo Chemical Co., Ltd., trade name: JELCON-SRV-BR(A)) into 67 parts by weight of a solvent (manufactured by Kyowa Hakko Kogyo Co., Ltd., trade name: Butycell Acetate) by heating at 90° C. The varnish B solution was prepared by dissolving 100 parts by weight of a base solution B (manufactured by Jujo Chemical Co., Ltd., trade name: JELCON-SRV-TC(B)) into 67 parts by weight of a similar solvent (manufactured by Kyowa Hakko Kogyo Co., Ltd., trade name: Butycell Acetate) by heating at 90° C.

Into 100 parts by weight of each of the varnish A and the vanish B solution were blended 5 parts by weight of conductive carbon black (manufactured by Lion Corp., trade name: Ketjen Black EC600JD) and 0.05 parts by weight of silane coupling agent (manufactured by Dow Corning Asia Corp., trade name: DC-Z6040) and premixed therewith, followed by sufficient kneading with a roll mill to prepare an conductive ink A solution and an conductive B solution.

Into 100 parts by weight of each of the varnish A and the varnish B solution were blended 15 parts by weight of silicon dioxide (manufactured by Japan Aerosyl Co., Ltd., trade name: Aerosyl R812) and premixed therewith, followed by sufficient kneading with a roll mill to prepare an insulating ink A solution and an insulating ink B solution.

Equal parts by weight of the conductive ink A solution and the conductive ink B solution were mixed together to prepare an conductive ink mixture solution, and equal parts by weight of the insulating ink A solution and the insulating ink B solution were mixed together to prepare an insulating ink mixture solution.

The conductive ink mixture solution and the insulating ink mixture solution were blended together at a required ratio and stirred to prepare a pressure-sensitive conductive ink, and the resultant ink was applied onto the electrode pattern on the sheet base of a polyethylene naphthalate film.

The screen-printed pressure-sensitive conductive ink was pre-cured for 4 minutes by a combination of hot air of 170° C. and a far infrared furnace having a surface temperature of 220° C., and two or three more ink layers were added by printing. Subsequently, the ink was further cured for 8 minutes by a combination of hot air of 170° C. and a far infrared furnace having a surface temperature of 220° C. in the same manner as described above to obtain a pressure-sensitive sensor sample.

The silicone elastomer obtained by mixing and thermally curing the conductive ink mixture solution and the insulating ink mixture solution has a glass transition temperature around −40° C. This applies also to the following Examples 2 and 3.

The content of conductive carbon black differs depending on the resistance value of pressure-sensitive conductive ink. With respect to 100 parts by weight of the silicone elastomer component, a range of 3 to 20 parts by weight of conductive carbon black is favorable, and further a range of 3 to 10 parts by weight is more favorable. Conductive carbon black having a primary particle size of 30 nm was used, but those having a primary particle size of about 20 to about 40 nm can be used similarly.

With respect to 100 parts by weight of the silicone elastomer component, a range of 30 to 70 parts by weight of silicon dioxide is favorable, and a range of 40 to 60 parts by weight is more favorable. Silicon dioxide having a primary particle size of about 7 nm was used, but those having a primary particle size of about 7 to about 40 nm can be also used.

EXAMPLE 2

A varnish A solution and a varnish B solution, which made from two-liquid curing type silicone elastomer base solutions, were prepared in the same manner as in Example 1.

Into 100 parts by weight of each of the varnish A solution and the vanish B solution were blended 15 parts by weight of conductive carbon black (manufactured by Cabot Specialty Chemicals Inc., trade name: VALCANXC72-R) and 0.15 parts by weight of silane coupling agent (manufactured by Dow Corning Asia Corp., trade name: DC-Z6040) and premixed therewith, followed by sufficient kneading with a roll mill to prepare an conductive ink A solution and an conductive ink B solution.

Into 100 parts by weight of each of the varnish A solution and the varnish B solution were blended 15 parts by weight of silicon dioxide (manufactured by Japan Aerosyl Co., Ltd., trade name: Aerosyl R812) and premixed therewith, followed by sufficient kneading with a roll mill to prepare an insulating ink A solution and an insulating ink B solution.

Equal parts by weight of the conductive ink A solution and the conductive ink B solution were mixed together to prepare an conductive ink mixture solution, and equal parts by weight of the insulating ink A solution and the insulating ink B solution were mixed to prepare an insulating ink mixture solution.

The conductive and the insulating ink mixture solutions were blended together at a required ratio and stirred to prepare a pressure-sensitive conductive ink, and the resultant ink was applied onto the electrode pattern on the sheet base of a polyethylene naphthalate film.

The screen-printed pressure-sensitive conductive ink was cured in the same manner as in Example 1 to obtain a pressure-sensitive sensor sample.

The content of conductive carbon black differs depending on the resistance value of pressure-sensitive conductive ink. With respect to 100 parts by weight of the silicone elastomer component, a range of 5 to 50 parts by weight of conductive carbon black is favorable, and further a range of 5 to 20 parts by weight is more favorable. Conductive carbon black having a primary particle size of 30 nm was used, but those having a primary particle size of about 20 to 40 nm can be also used.

With respect to 100 parts by weight of the silicone elastomer component, a range of 30 to 70 parts by weight of silicon dioxide is favorable, and further a range of 40 to 60 parts by weight is more favorable. Silicon dioxide having a primary particle size of 7 nm was used, but those having a primary particle size of about 7 to about 40 nm can be also used.

EXAMPLE 3

A varnish A solution and a varnish B solution, which are made from two-liquid curing type silicone elastomer base solutions, were prepared in the same manner as in Example 1.

Into 100 parts by weight of each of the varnish A solution and the vanish B solution were blended 10 parts by weight of carbon black (PRINTEX XE-2B BEADS) and 0.10 part by weight of silane coupling agent (manufactured by Dow Corning Asia Corp., trade name: DC-Z6040) and premixed therewith, followed by sufficient kneading with a roll mill to prepare an conductive ink A solution and an conductive B solution.

Into 100 parts by weight of each of the varnish A solution and the vanish B solution were blended 15 parts by weight of silicon dioxide (manufactured by Japan Aerosyl Co., Ltd., trade name: Aerosyl R812) and premixed therewith, followed by sufficient kneading with a roll mill to prepare an insulating ink A solution and an insulating ink B solution.

Equal parts by weight of the conductive ink A solution and the conductive ink B solution were mixed together to prepare an conductive ink mixture solution, and equal parts by weight of the insulating ink A solution and the insulating ink B solution were mixed together to prepare an insulating ink mixture solution.

The conductive and the insulating ink mixture solutions were blended together at a required ratio and stirred to prepare a pressure-sensitive conductive ink, and the resultant ink was applied onto the electrode pattern on the sheet base of a polyethylene naphthalate film.

The screen-printed pressure-sensitive conductive ink was cured in the same manner as in Example 1 to obtain a pressure-sensitive sensor sample.

The content of conductive carbon black differs depending on the resistance value of pressure-sensitive conductive ink and, with respect to 100 parts by weight of the silicone elastomer component, a range of 3 to 10 parts by weight of conductive carbon black is favorable. Conductive carbon black having a primary particle size of 30 nm was used, but those having a primary particle size of about 20 to about 40 nm can be also used.

With respect to 100 parts by weight of the silicone elastomer component, a range of 30 to 70 parts by weight of silicon dioxide is favorable, and more favorably a range of 40 to 60 parts by weight. Silicon dioxide having a primary particle size of about 7 nm was used, but those having a primary particle size of about 7 to about 40 nm can be also used.

Comparative Example 1

To 16.9 parts by weight of pellet-shaped phenoxy resin (manufactured by Toto Kasei Co., Ltd., trade name: Phenototo YP-50S), 2.8 parts by weight of conductive carbon black (manufactured by Lion Corp., trade name: Ketgen Black EC600JD) and 2.8 parts by weight of silicon dioxide (manufactured by Japan Aerosyl Co., Ltd., trade name: Aerosyl R812), 59.4 parts by weight of a solvent (manufactured by Kyowa Hakko Kogyo Co., Ltd., trade name: Butycell Acetate) were added and pre-mixed therewith, followed by sufficient kneading with a roll mill.

To the foregoing kneaded mixture, 18.1 parts by weight of TDI adduct type polyisocyanate (manufactured by Nippon Polyurethane Co., Ltd., trade name: Coronate L-70B) were added as a curing agent, and fully stirred. This kneaded mixture was then printed on an electrode pattern on a sheet base of a polyethylene naphthalate with a screen printer, pre-cured for 4 minutes in an oven of 100° C., and further cured additionally for 4 minutes at 145° C. to obtain a sample of a pressure-sensitive sensor.

Comparative Example 2

A varnish A solution and a varnish B solution, which are made from two-liquid curing type silicone elastomer base solutions, were prepared in the same manner as in Example 1. Using these varnish A and B solutions, an conductive ink A solution and an conductive ink B solution were prepared in the same manner as in Example 1.

The varnish A solution and the varnish B solution were used as the insulating ink A solution and the insulating ink B solution, respectively.

Equal parts by weight of the conductive ink A solution and the conductive ink B solution were mixed together to prepare an conductive ink mixture solution, and equal parts by weight of the insulating ink A solution and the insulating ink B solution were mixed together to prepare an insulating ink mixture solution.

A pressure-sensitive conductive ink was prepared by stirring 40 parts by weight of the conductive ink mixture solution and 60 parts by weight of the insulating ink mixture solution, and applied onto an electrode pattern on a sheet base of a polyethylene naphthalate film.

The screen-printed pressure-sensitive conductive ink was cured in the same manner as in Example 1 to obtain a pressure-sensitive sensor sample.

(Evaluation Test on Temperature Characteristics)

Figure 4:
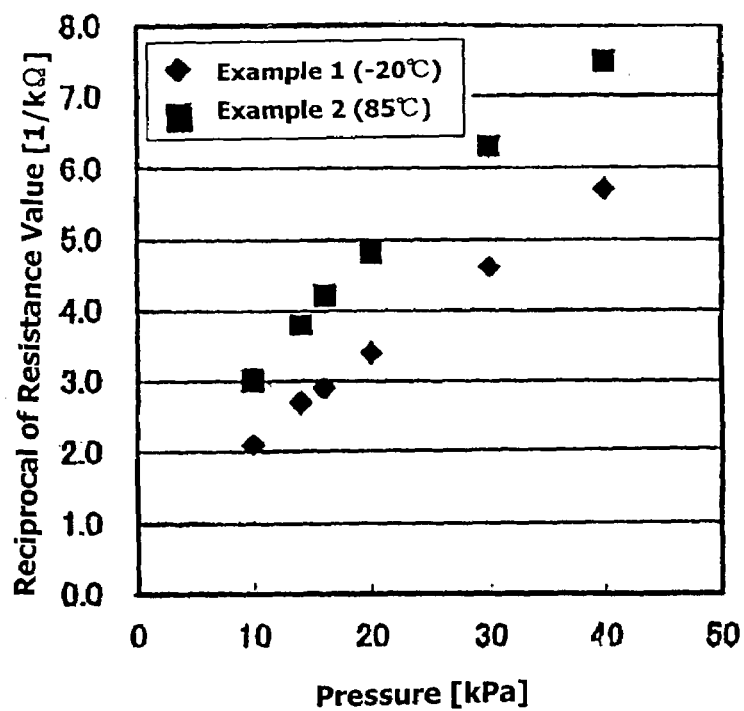
FIG. 4 is a graph showing the result of evaluation on temperature characteristics of the pressure-sensitive sensor using pressure-sensitive conductive ink of Example 1.
Figure 5:
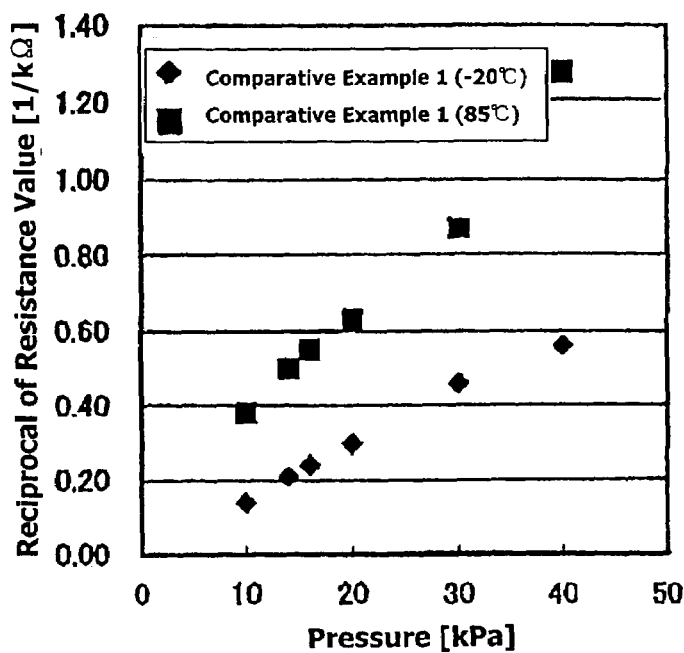
FIG. 5 is a graph showing the result of evaluation on temperature characteristics of the pressure-sensitive sensor using pressure-sensitive conductive ink of Comparative Example 1.
Figure 6:
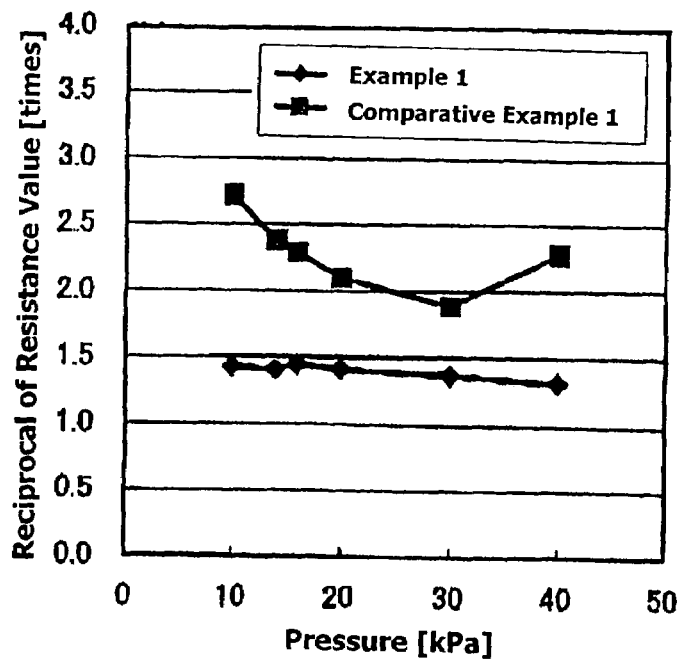
FIG. 6 is a graph showing evaluation on temperature characteristics (change in reciprocal of resistance value) of the pressure-sensitive sensors respectively using pressure-sensitive conductive ink of Example 1 and Comparative Example 1.

The pressure-sensitive resistance value of a pressure-sensitive sensor having a single cell pattern (having a single pressure-sensitive element) was measured at temperatures of $-20°$ C. and $85°$ C. under pressures of 10, 14, 16, 20, 30, and 40 kPa to evaluate change in the reciprocal of the resistance value by temperatures. The result of Example 1 is shown in FIG. 4, and that of Comparative Example 1 is shown in FIG. 5. FIG. 6 shows comparison between the results of Example 1 and Comparative Example 1. Here, though the same test was carried out on Examples 2, 3 and the comparative Example 2, the results of these tests are not shown in graphs.

(Evaluation Test on Linearity of Pressure Sensitiveness)

The pressure-sensitive resistance value of a pressure-sensitive sensor having a single cell pattern (having a single pressure-sensitive element) was measured at room temperature ($25°$ C.) under pressures in the range from 4.9 to 98 kPa.

Figure 7:
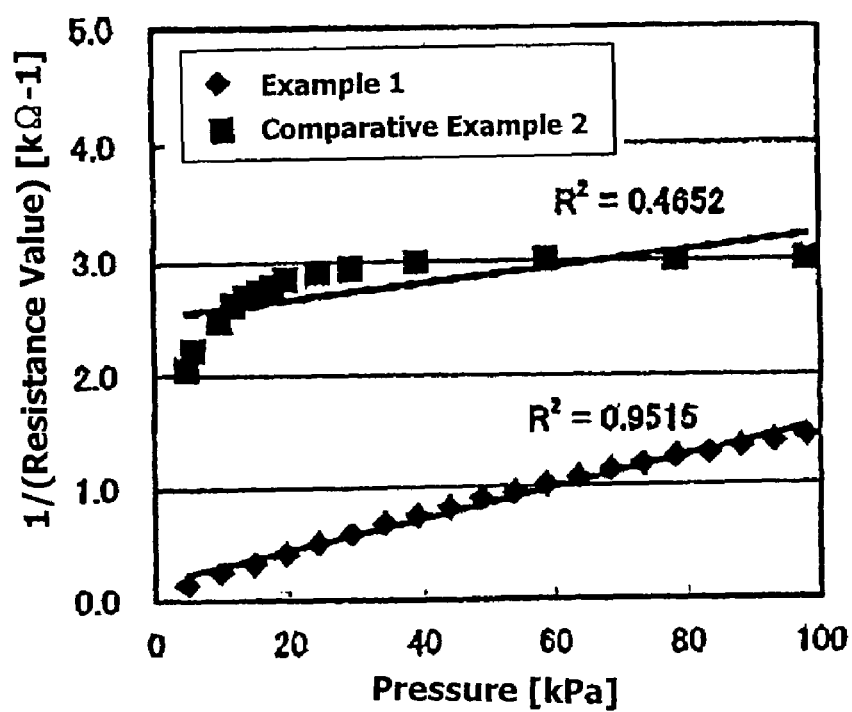
FIG. 7 is a graph showing the result of evaluation on linearity of pressure sensitiveness of the pressure-sensitive sensors respectively using pressure-sensitive conductive ink of Example 1 and Comparative Example 2.

The linearity was evaluated by making a plot (FIG. 7) with the X axis representing the pressure and the Y axis representing the reciprocal of the resistance value, and taking line approximation to calculate the R-square value ($R^2$) based on the regression analysis calculation. Although the same test was carried out on Examples 2, 3 and Comparative Example 1, graphs showing the results thereof are not shown herein.

(Evaluation Test on Output Variation)

Twenty row electrodes and twenty column electrodes were printed on respective sheet bases at a constant pitch, and the two sheet bases were bonded together in a fashion that the row and the column electrodes crossed each other perpendicularly to obtain a T-20×20 pattern pressure-sensitive sensor, which is known as a tactile sensor, shown as in FIGS. 1 to 3. The output of the crossing positions on the row electrodes at which the row and column electrodes were crossing was measured under a pressure of 15 kPa.

The output average value was calculated from the total output values of the crossing positions on the row electrodes, the variation coefficient was calculated from the output standard deviation, and the output variation was evaluated.

(Overall Evaluation)

TABLE 1

|  | Examples | | | Comparative Examples | |
|---|---|---|---|---|---|
|  | 1 | 2 | 3 | 1 | 2 |
| Change in reciprocal of resistan value at $-20°$ C. → $85°$ C. (average each measuring pressure) | 1.4 times | 1.4 times | 1.4 times | 2.3 times | 1.4 times |
| Linearity of pressure sensitiveness ($R^2$ value) | 0.95 | 0.96 | 0.94 | 0.98 | 0.47 |
| Output variation (variation coefficient) | 0.28 | 0.22 | 0.27 | 0.35 | 0.37 |

From Table 1 shown above, it is clear that the pressure-sensitive sensor S using the pressure-sensitive conductive ink of Example 1 has an improved output stability and output irregularity at temperatures in a wide range from $-20°$ C. to a high temperature of $85°$ C., and also has a determining coefficient of linearity of pressure sensitiveness of output.

EXAMPLE 4

Figure 8:
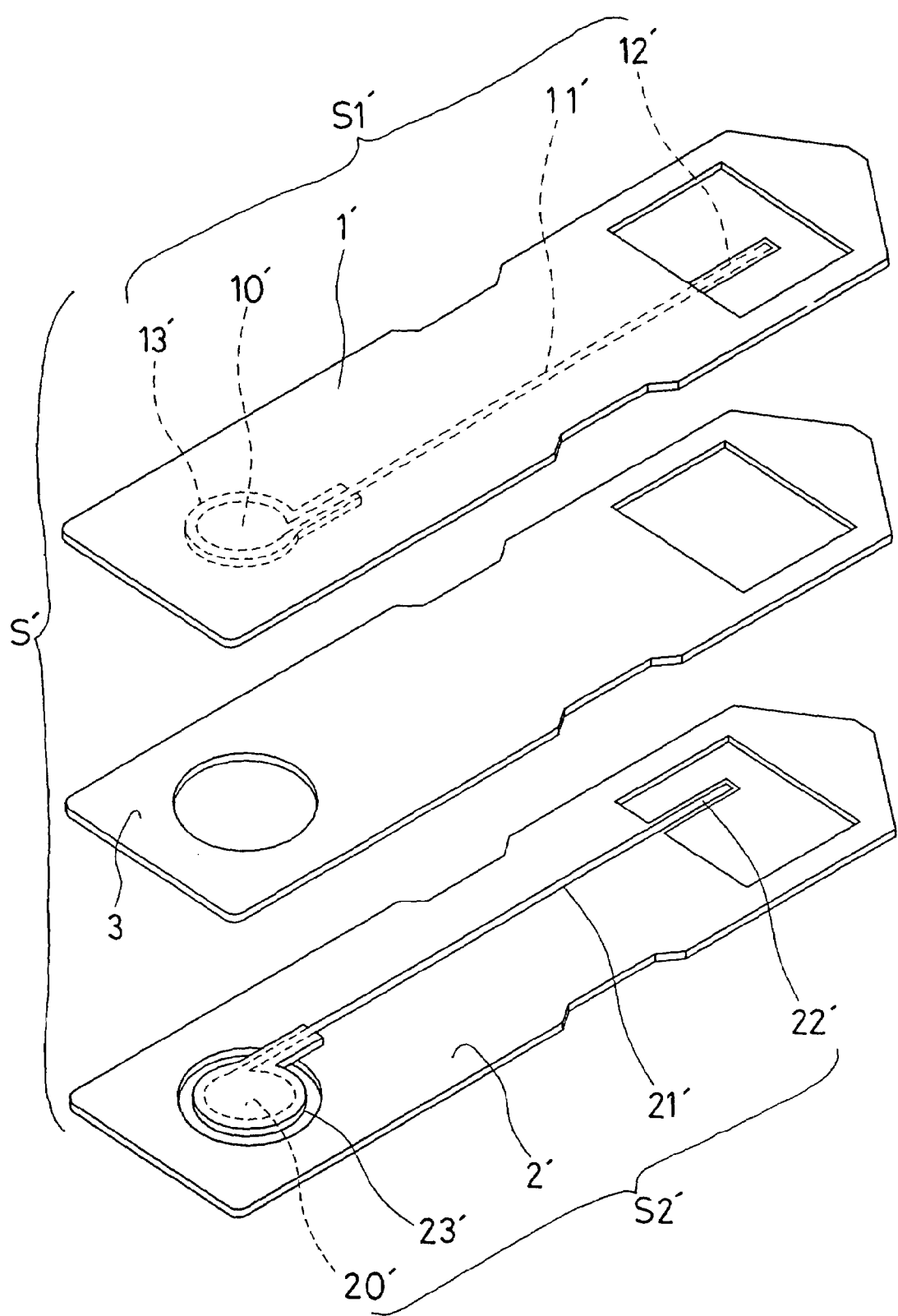
FIG. 8 is an exploded perspective view of the pressure-sensitive sensor of Examples 4 to 6 of this invention.

FIG. 8 shows an exploded perspective view of a pressure-sensitive sensor S' according to the present invention, which has a single cell pattern, and this sensor S' is used in the evaluation test of temperature characteristics and the evaluation test of the linearity of pressure sensitiveness. The pressure-sensitive part of the sensor S' is shown in FIG. 9.

As shown in FIG. 8, this pressure-sensitive sensor S' is formed in a fashion that a constituent element S1' and a constituent element S2' are bonded together having a spacer 3 therebetween.

The constituent element S1' was formed in a fashion that, on a sheet base member 1' of polyethylene naphthalate, application-side electrodes 10', application-side terminals 11' and connecting wires 12' were applied with a silver paste (manufactured by Acheson (Japan) Ltd., trade name: Electrodag PF-836) by pattern printing, followed by curing for 4 minutes using both hot air of $170°$ C. and a far infrared furnace having a surface temperature of $220°$ C. The constituent element S2' was similarly formed with receiving-side electrodes 20', receiving-side terminals 21' and connecting wires 12'. Furthermore, on the application-side electrodes 10' and the receiving-side electrodes 20', pressure-sensitive ink prepared by blending and stirring an conductive ink mixture solution and an insulating ink mixture solution at a suitable ratio in the same manner as in Example 1 was applied by screen printing, and was pre-cured for 4 minutes using both hot air of $170°$ C. and a far infrared furnace having a surface temperature of $220°$ C. Another 2 or 3 layers of the ink were printed, and cured for 8 minutes at the temperatures similar to the above.

Figure 9:
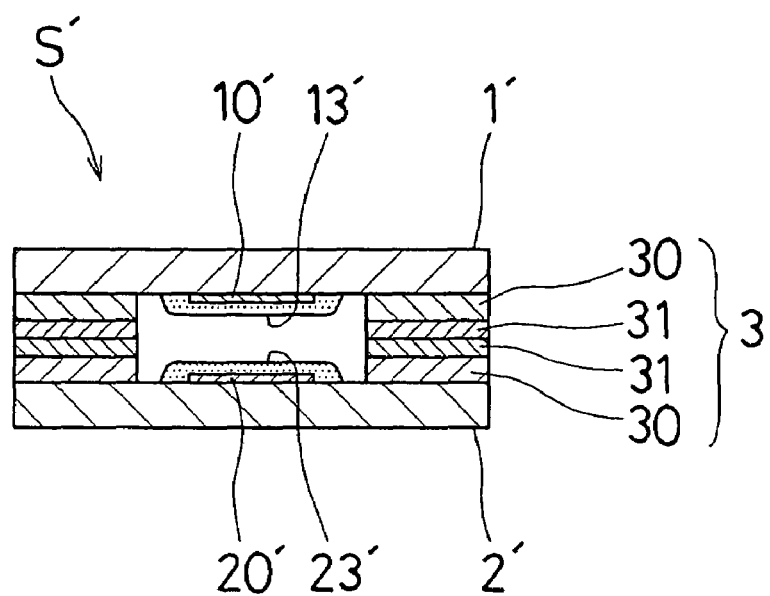
FIG. 9 is a cross-sectional view of the pressure-sensitive part and its neighborhood of Example 4.

As shown in FIG. 9, the spacer 3 was constructed by applying a UV coating agent 30 (manufactured by Acheson (Japan) Ltd., trade name: UV-curing type insulating ink JE-1000G) on the sheet base members 1' and 2' so as to surround the pressure-sensitive conductive ink 13' and 23', which functions as a pressure-sensitive part, by screen printing, and curing the agent with UV radiation with an accumulated light quantity of 1000 mJ/cm². Furthermore, on the printed and cured UV coating agent 30, an adhesive agent 31 (manufactured by Teikoku Printing Inks Mfg. Co., Ltd., trade name: CAT-1300S) was added by screen printing, and cured for 8 minutes with hot air of $120°$ C.

Here, a sensor sample of Example 4 was obtained by bonding the constituent element S' and the constituent element S2' together through the adhesive agents 31 and 31.

EXAMPLE 5

Figure 10:
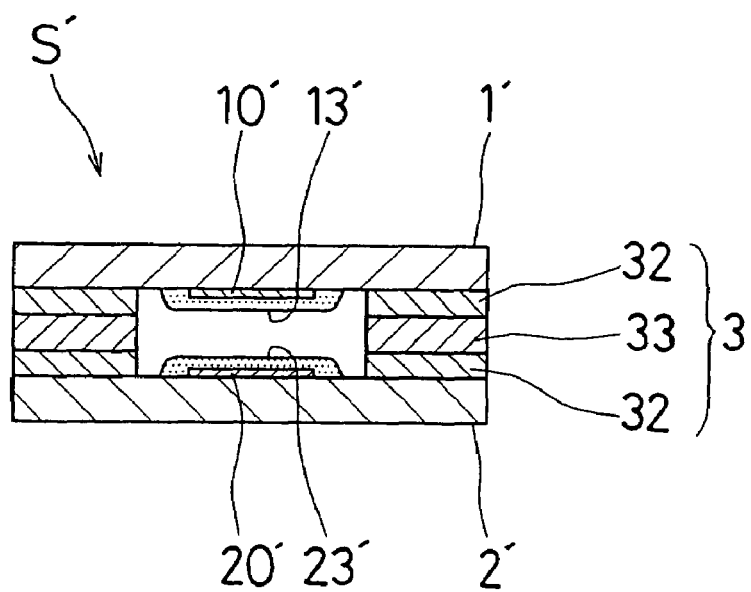
FIG. 10 is a cross-sectional view of the pressure-sensitive part and its neighborhood of Example 5.

The sensor S' of Example 5 basically has the same form as the sensor S' of Example 4 except that the spacer 3 differs from that of Example 4, as shown in FIG. 10.

The spacer 3 of Example 5 was formed as follows. An adhesive agent 32 (manufactured by Teikoku Printing Inks Mfg. Co., Ltd., trade name: CAT-1300S) was applied on the sheet base members 1' and 2' of polyethylene naphthalate so as to surround the pressure-sensitive conductive ink 13' and 23', which functions as the pressure-sensitive part, shown as in FIG. 10, and cured for 8 minutes with hot air of 120° C. A polyethylene naphthalate sheet 33 with a cut at a position corresponding to the pressure-sensitive conductive ink 13' and 23'part, which functions as the pressure-sensitive part, was bonded between the adhesive agents 32 and 32 formed on the sheet base members 1', 2', thereby to obtain a pressure-sensitive sensor sample.

EXAMPLE 6

Figure 11:
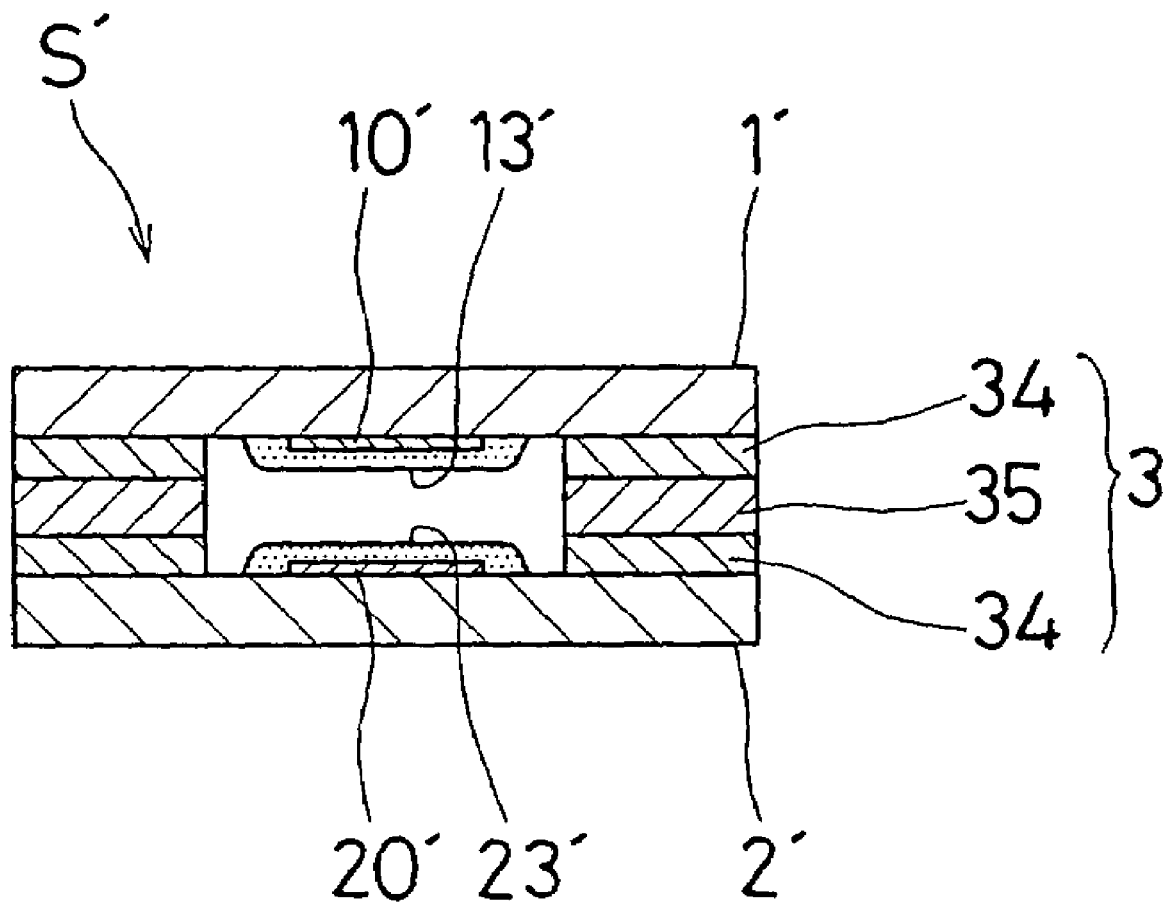
FIG. 11 is a cross-sectional view of the pressure-sensitive part and its neighborhood of Example 6.

The pressure-sensitive sensor S' of Example 6 basically has the same structure as that of Example 4 except that the spacer 3 differs from that of Example 4, as shown in FIG. 11.

The spacer 3 of Example 6 was formed as follows. An adhesive agent 34 (manufactured by Teikoku Printing Inks Mfg. Co., Ltd., trade name: CAT-1300S) was applied on the sheet base members 1' and 2'of polyimide so as to surround the pressure-sensitive conductive ink 13' and 23', which is functions as the pressure-sensitive part, as shown in FIG. 11, and cured for 8 minutes with hot air of 120° C. A polyimide sheet 35 with a cut at the position corresponding to the pressure-sensitive conductive ink 13' and 23' part was bonded between the adhesive agents 34 and 34 on the sheet base members 1' and 2', and thereby a pressure-sensitive sensor sample was obtained.

(Evaluation Test on Temperature Characteristics)

Figure 13:
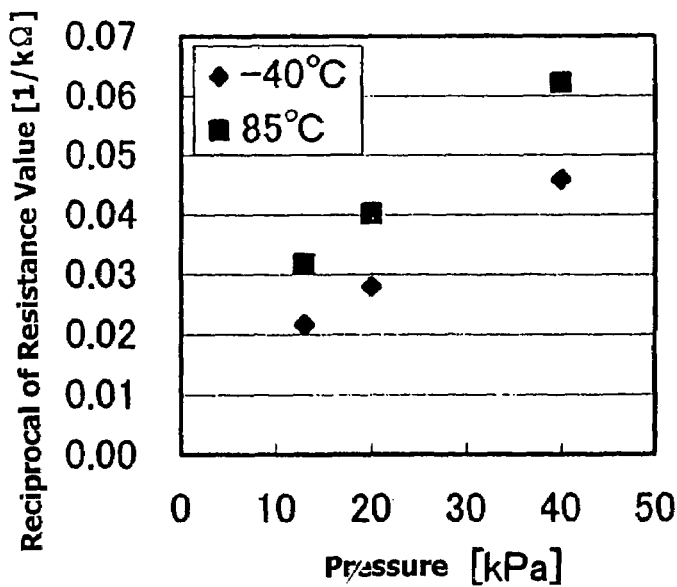
FIG. 13 is a graph showing the result of evaluation on temperature characteristics of the pressure-sensitive sensor of Example 4.
Figure 15:
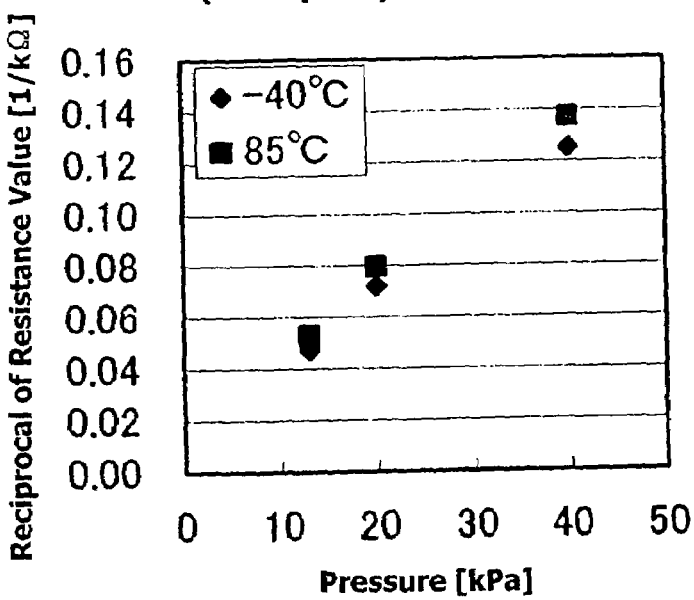
FIG. 15 is a graph showing the results of evaluation on temperature characteristics of the pressure-sensitive sensor of Example 5.
Figure 17:
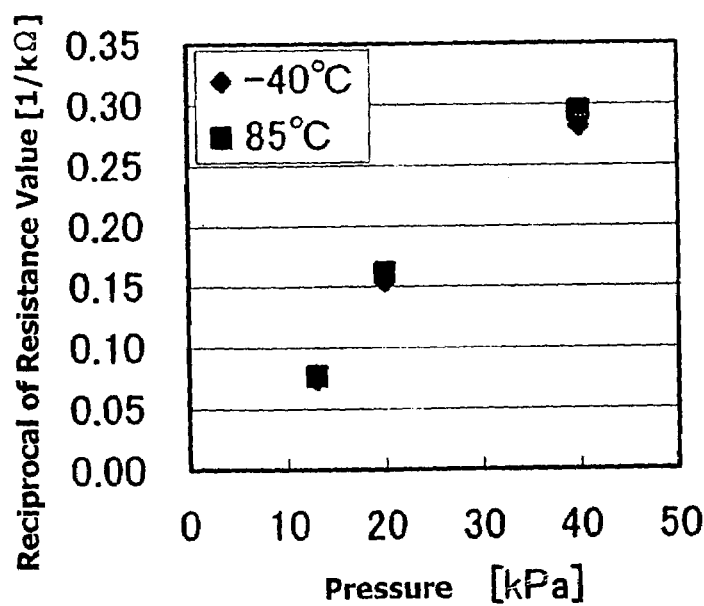
FIG. 17 is a graph showing the result of evaluation on temperature characteristics of the pressure-sensitive sensor of Example 6.

The pressure-sensitive resistance value of the pressure-sensitive sensor S' was measured at temperatures of −40° C. and 85° C. under pressures of 13, 20 and 40 kPa to evaluate change in the reciprocal of the resistance value by temperature. The results of Examples 4, 5 and 6 are shown in the graphs of FIGS. 13, 15 and 17 respectively.

(Evaluation Test on Linearity of Pressure Sensitiveness) The pressure-sensitive resistance value of the pressure-sensitive sensor S' was measured at room temperature (25° C.) under pressures in a range of 0 to 100 kPa.

Figure 12:
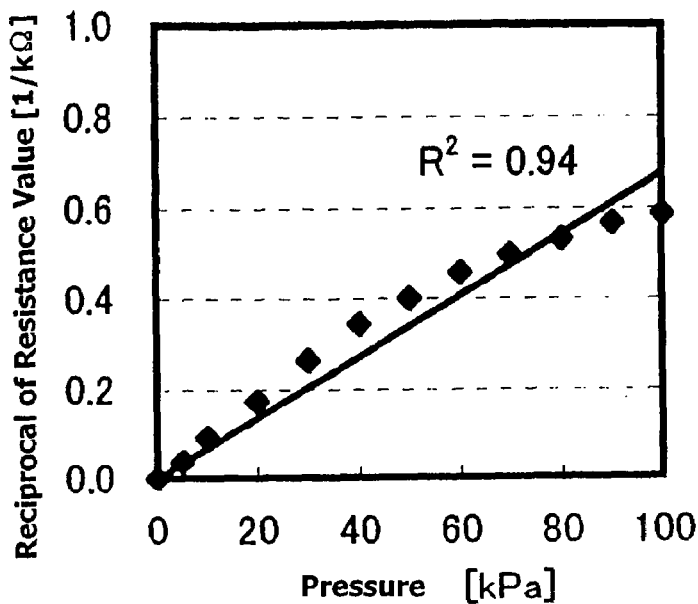
FIG. 12 is a graph showing the result of evaluation on pressure sensitive characteristics of the pressure-sensitive sensor of Example 4.
Figure 14:
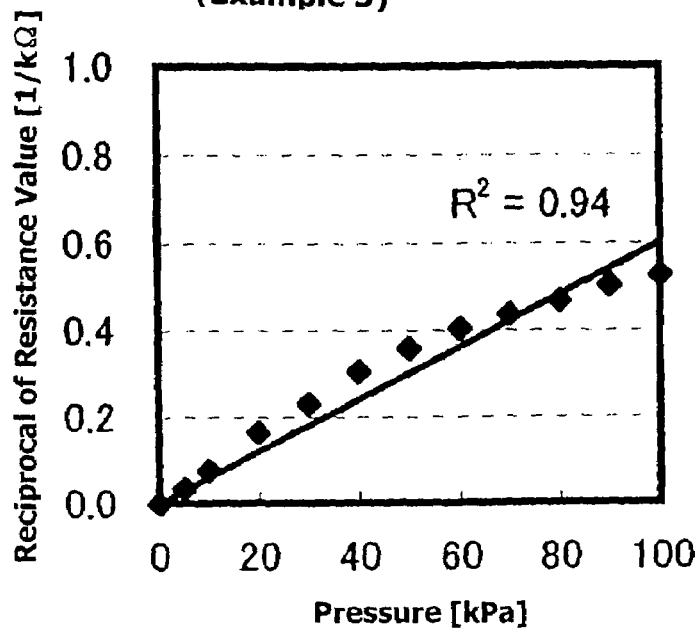
FIG. 14 is a graph showing the result of evaluation on pressure sensitive characteristics of the pressure-sensitive sensor of Example 5.
Figure 16:
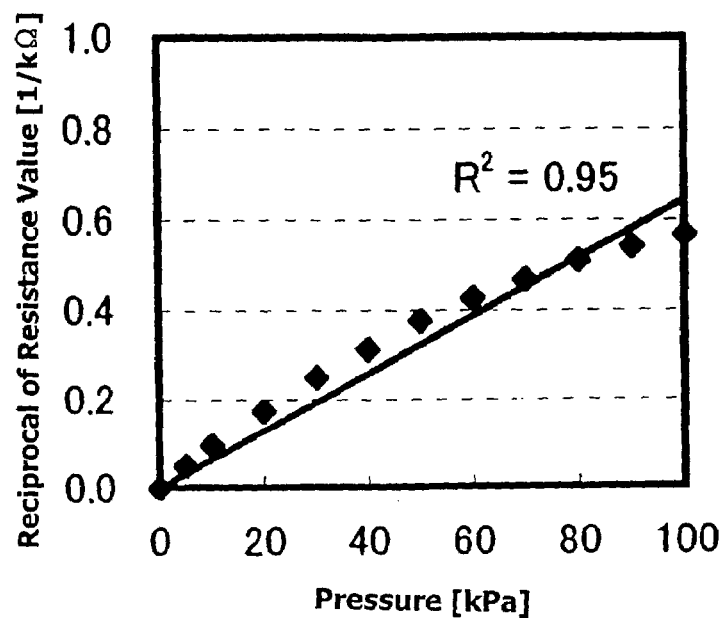
FIG. 16 is a graph showing the result of evaluation on pressure sensitive characteristics of the pressure-sensitive sensor of Example 6.

The linearity was evaluated by making a plot with the X axis representing the pressure and the Y axis representing the reciprocal of the resistance value. With line approximation and calculation of the R-square value ($R^2$) based on the regression analysis calculation, linearity was evaluated. The results of Example 4, 5 and 6 are respectively shown in FIGS. 12, 14 and 16.

Twenty row electrodes and twenty column electrodes were printed on respective sheet bases at a constant pitch, and the two sheet bases were bonded together in a fashion that the row and the column electrodes crossed each other perpendicularly to obtain a T-20×20 pattern pressure-sensitive sensor, which is known as a tactile sensor, as shown in FIGS. 1 to 3. The output at the crossing positions on the row electrodes at which the row and column electrodes were crossing was measured under a pressure of 15 kPa.

The output average value was calculated from the total output values of the crossing positions on the row electrodes, and the variation coefficient was calculated from the output standard deviation to evaluate the output variation.

(Overall Evaluation)

TABLE 2

| | Examples | | |
|---|---|---|---|
| | 4 | 5 | 6 |
| Change in the reciprocal of resistance value at −40 85° C. (average of each measuring pressure) | 1.42 times | 1.10 times | 1.04 times |
| Linearity of pressure sensitiveness ($R^2$ value) | 0.94 | 0.94 | 0.95 |
| Output variation (variation coefficient) | 0.24 | 0.24 | 0.23 |

From Table 2 shown above, it is clear that the pressure-sensitive sensors S' of Examples 4, 5 and 6, which has the pressure-sensitive conductive ink of Example 1 and the spacer 3, have an improved output stability and an reduced output irregularity at temperatures in a wide range from −40° C. to 85° C., and also have a determining coefficient of linearity of pressure sensitiveness of output.

What is claimed is:

1. A pressure sensitive sensor comprising:
   a sheet base;
   an application-side and a receiving-side electrode provided on the sheet base;
   conductive coatings provided on the electrodes, the coating being provided with pressure-sensitive conductive ink containing conductive carbon black;
   in which resistance between the application-side electrode and the receiving-side electrode changes by a contact area between the conductive coatings on the electrodes; and
   wherein the pressure-sensitive conductive ink has an enhanced strength as a resin and an enhanced effect of dispersion of the conductive carbon black by adding 30 to 70 parts by weight of silicon dioxide to 100 parts by weight of silicone elastomer component as a binder.

2. The pressure-sensitive sensor according to claim 1, wherein the silicon dioxide has a primary particle size of 7 to 40 nm, the conductive carbon black has a primary particle size of 20 to 40 nm and is contained at 3 to 50 parts by weight with respect to 100 parts by weight of the silicone elastomer component.

3. The pressure-sensitive sensor according to claim 2, further comprising a multi-point pressure-sensitive part with a variation coefficient of output greater than 0 and less than or equal to 0.3.

4. The pressure-sensitive sensor according to claim 2, wherein the sheet base is formed with a pair of sheet base members of polyethylene naphthalate, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the spacer is formed with a UV coating agent layer and an adhesive agent layer.

5. The pressure-sensitive sensor according to claim 2, wherein the sheet base is formed with a pair of sheet base members of polyethylene naphthalate, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the spacer is formed a polyethylene naphthalate film and an adhesive agent layer.

6. The pressure-sensitive sensor according to claim 2, wherein the sheet base comprises a pair of sheet base members of polyimede, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the space is formed a polyimede film and an adhesive agent layer.

7. The pressure-sensitive sensor according to claim 1, further comprising a multi-point pressure-sensitive part with a variation coefficient of output greater than 0 and less than or equal to 0.3.

8. The pressure-sensitive sensor according to claim 1, wherein the sheet base is formed with a pair of sheet base members of polyethylene naphthalate, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the spacer is formed with a UV coating agent layer and an adhesive agent layer.

9. The pressure-sensitive sensor according to claim 1, wherein the sheet base is formed with a pair of sheet base members of polyethylene naphthalate, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the spacer is formed a polyethylene naphthalate film and an adhesive agent layer.

10. The pressure-sensitive sensor according to claim 1, wherein the sheet base comprises a pair of sheet base members of polyimede, one of the members being provided with the conductive coating covering the application-side electrode and another of the members being provided with the conductive coating covering the receiving-side electrode, wherein a spacer is provided between the sheet base members so as to surround the conductive coatings and obtain a space between the conductive coatings opposing each other at a no-load state, and the space is formed a polyimede film and an adhesive agent layer.

* * * * *